United States Patent [19]

Yoshigai

[11] Patent Number: 4,961,354
[45] Date of Patent: Oct. 9, 1990

[54] WIRE CONNECTING STRUCTURE FOR BRAKE MANIPULATING DEVICE OR OPERATING DEVICE

[75] Inventor: Toshiharu Yoshigai, Higashi-Osaka, Japan

[73] Assignee: Yoshigai Kikai Kinzoku Kabushiki Kaisha, Japan

[21] Appl. No.: 833,155

[22] Filed: Feb. 2, 1986

[30] Foreign Application Priority Data

Feb. 28, 1985 [JP] Japan ................................ 60-28756

[51] Int. Cl.$^5$ ............................................... F16C 1/26
[52] U.S. Cl. ...................................... 74/502.6; 74/489; 74/502.2; 16/112; 16/DIG. 24; 188/24.21
[58] Field of Search ................. 74/500.5, 501.6, 502.2, 74/502.6, 512, 489, 488, 566; 188/20, 24, 24.21; 384/428, 439, 215; 403/158, 162, 155; 16/DIG. 24, 112, 123.2

[56] References Cited

U.S. PATENT DOCUMENTS

| 847,719 | 3/1907 | Arnold | 403/155 |
|---|---|---|---|
| 1,220,991 | 3/1917 | McGinley | 384/295 |
| 1,817,892 | 8/1931 | Claus | 384/295 X |
| 2,376,406 | 5/1945 | Weingart | 384/439 |
| 2,422,327 | 6/1947 | Winslow | 403/158 X |
| 3,002,412 | 10/1961 | Andersen | 74/512 X |
| 3,565,499 | 2/1971 | Fisher | 384/439 |
| 3,776,061 | 12/1973 | Yoshigai | 74/489 |
| 3,915,028 | 10/1975 | Kine | 74/489 X |
| 4,005,874 | 2/1977 | Ohtani | 188/24.21 X |
| 4,275,615 | 6/1981 | Yoshigai | 74/489 |
| 4,380,860 | 4/1983 | Kiester et al. | 16/2 X |
| 4,553,641 | 11/1985 | Scott et al. | 188/2 D |

FOREIGN PATENT DOCUMENTS

| 1056432 | 4/1959 | Fed. Rep. of Germany | 74/489 |
|---|---|---|---|
| 425312 | 9/1947 | Italy | 74/489 |
| 435439 | 5/1948 | Italy | 74/489 |
| 449403 | 6/1949 | Italy | 74/489 |
| 649552 | 1/1951 | United Kingdom | 74/489 |

Primary Examiner—Rodney M. Lindsey
Attorney, Agent, or Firm—Sixbey, Friedman, Leedom & Ferguson

[57] ABSTRACT

A brake manipulating member or operating member has a pair of opposed walls each formed with a hole. A capped bush made of abrasion-resistant synthetic resin and having a flange around a closed end thereof and a retaining flange around an open end thereof is fitted in the hole with the open end positioned inward. A roller-shaped connector has a trunk portion slightly smaller than the hole in diameter, a short pin portion projecting from each end of the trunk portion, a wire engaging portion at the center of the trunk portion and an overall length equal to or slightly smaller than the outside width of the portion of the manipulating or operating member having the two walls. The opposite pin portions of the connector are inserted in and supported by the bushes mounted on the pair of walls.

1 Claim, 3 Drawing Sheets

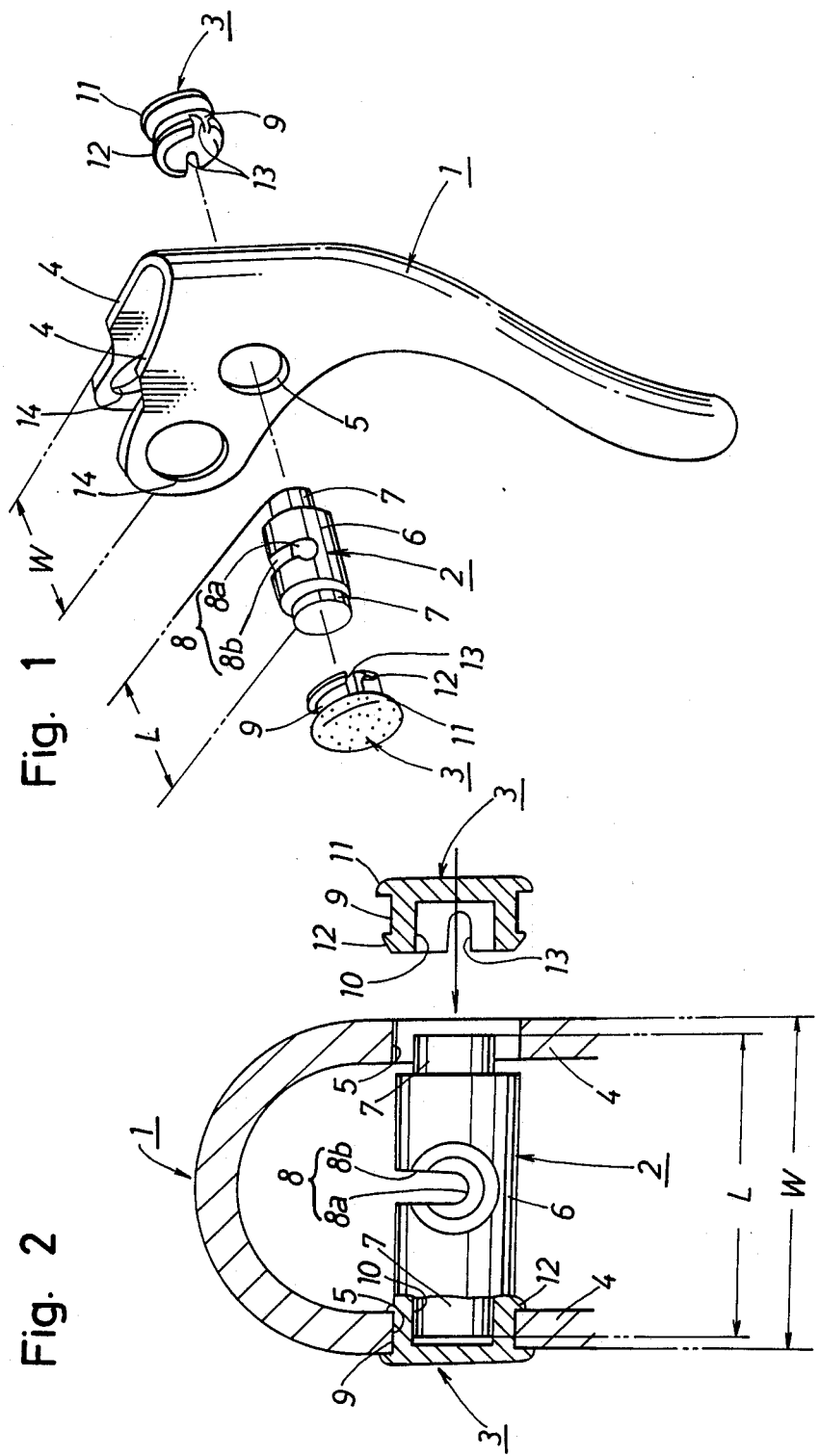

WIRE CONNECTING STRUCTURE FOR BRAKE MANIPULATING DEVICE OR OPERATING DEVICE

FIELD OF THE INVENTION AND RELATED ART STATEMENT

The present invention relates to improvements in a wire connecting structure in a lever device for manipulating a brake or a device for operating a brake actuating assembly by a wire, for example, for use in bicycles.

FIG. 4 is a perspective view showing the wire connecting assembly of a conventional manipulating device, more specifically, the inner wire connecting assembly of a lever device for manipulating a brake for use in bicycles while the assembly is being assembled. With reference to the drawing, a manipulating member (lever) 1 has a pair of opposed walls 4, 4 formed with holes 5, 5. A roller-shaped connector 2 has a trunk portion considerably larger than the holes 5, 5 in diameter, short pin portions 7, 7 projecting from the opposite ends of the trunk portion and having a smaller diameter than the holes 5, 5, and an inner wire engaging portion 8 provided at the center of the trunk portion. The entire length L of the connector 2 is equal to or slightly smaller than the distance W between the outer surfaces of the walls 4, 4 of the manipulating member 1 after the assembly of the components as indicated in phantom lines. The connector 2 is rotatably supported by the walls 4, 4 as placed therebetween when the short pin portions 7, 7 are inserted in the holes 5, 5. In order to cause the walls 4, 4 to support the connector 2, it is required to insert the pin portions 7, 7 into the holes 5, 5, respectively, in the course of press work when the walls 4, 4 of the manipulating member 1 have been formed in a V shape as illustrated and to subsequently make the walls parallel by press work as indicated in the phantom lines.

In ah automatic forming-assembling line for the manipulating device, the above process has the drawback of interrupting the work to attach the connector 2 to the manipulating member 1. Further because the connector 2 must be attached to the manipulating member 1 during press work, the holes 5, 5 need to be made considerably larger than the pin portions 7, 7 of the connector 2 in diameter to permit deformation of the walls 4, 4. Consequently, when the device is completed, there is a large clearance in the holes 5, 5 around the pin portions 7, 7, permitting the connector 2 to backlash markedly upward or downward or sidewise. Further while the connector 2 is rotatably supported by the walls 4, 4 at the holes 5, 5 to follow the movement of the wire, the roller-shaped connector 2 is not rotatable smoothly because of the marked backlash and further because of the metal-to-metal sliding contact involved.

OBJECTS AND SUMMARY OF THE INVENTION

A first object of the present invention is to provide a wire connecting structure for a brake manipulating device or operating device which structure is so adapted that a roller-shaped connector can be rotatably mounted on a brake manipulating or operating member after the member has been formed in order to make the device efficient to assemble and manufacture.

A second object of the present invention is to provide a structure of the type described wherein each short pin portion of the roller-shaped connector is rotatably supported by a capped bush made of abrasion-resistant synthetic resin and fitted in a hole in the wall of the brake operating or manipulating member so that the connector is smoothly rotatable to follow the movement of the wire without backlash.

These objects of the present invention can be fulfilled by a wire connecting structure for a brake manipulating device or operating device which structure comprises:

a manipulating member or operating member having a pair of opposed walls each formed with a hole, a roller-type connector having a trunk portion slightly smaller than the hole in diameter and a short pin portion projecting from each end of the trunk portion, the connector having an overall length equal to or slightly smaller than the outside width of the portion of the manipulating member or operating member having the two walls, the connector having a wire engaging portion at the center of the trunk portion, and a pair of capped bushes made of abrasion-resistant synthetic resin and each having an outer periphery of the same diameter as the hole, an inner periphery diametrically slightly larger than the short pin portion of the connector, a flange on the outer periphery of a closed end thereof and a retaining flange on the outer periphery of an open end thereof, each of the bushes being fitted in the hole of the manipulating member or operating member and having the short pin portion of the connector inserted therein to support the pin portion by the inner periphery.

BRIEF DESCRIPTION OF THE DRAWINGS

FIG. 1 is an exploded perspective view showing a wire connecting structure embodying the present invention for use in a manipulating device;

FIG. 2 is a fragmentary sectional view showing the same;

DESCRIPTION OF THE PREFERRED EMBODIMENTS

Figure 3:
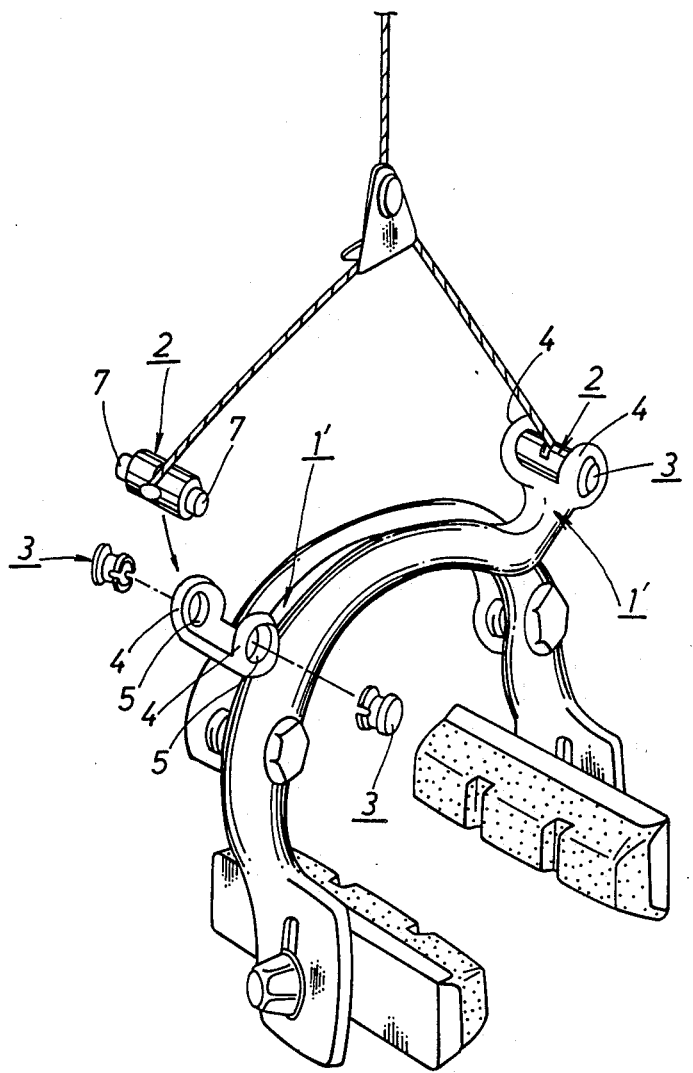
FIG. 3 is an exploded perspective view showing a wire connecting structure as another embodiment of the invention for use in an operating device.
Figure 4:
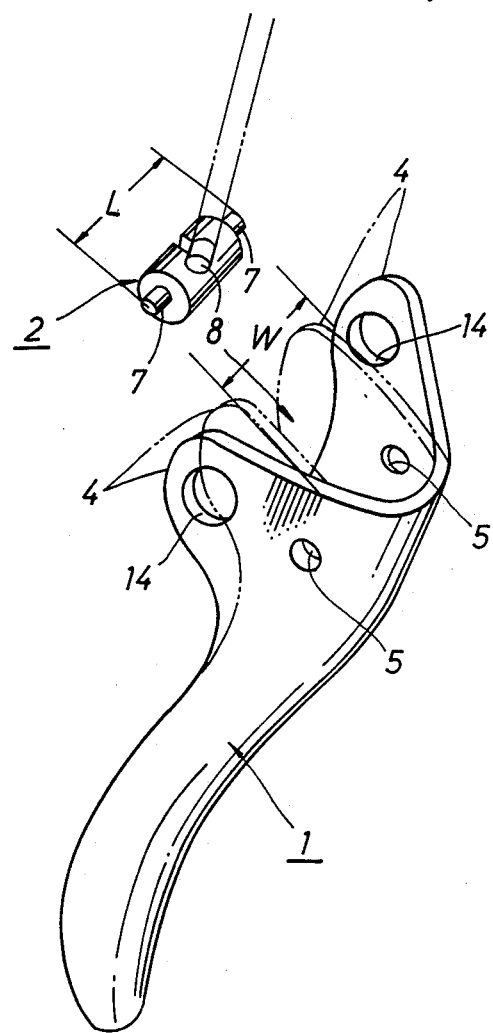
FIG. 4 is an exploded perspective view showing the wire connecting assembly of a conventional manipulating device while the parts are being assembled.

Embodiments of the present invention will be described below in detail with reference to the drawings, in which like parts are designated by like reference numerals.

FIG. 1 is a perspective view showing a wire connecting structure for a manipulating device, more specifically a Bowden wire connecting assembly in a lever device for manipulating a brake for use in bicycles. FIG. 2 is a fragmentary view in cross section through walls 4, 4. These drawings show a manipulating member (lever) 1, a roller-shaped connector 2 and capped bushes 3. The manipulating member 1 is made preferably of light alloy, U-shaped in cross section and L-shaped in its entirety. Since the member 1 is U-shaped in cross section, the member has a pair of opposed walls 4, 4 extending from its base end to the bent portion. At the base end, the walls have fulcrum bores 14, 14 for inserting therethrough a rod serving as a support for the manipulating member 1 acting as a lever. In the vicinity of the bent portion, the walls 4,4 have holes 5, 5 according to the present invention. The roller-shaped connector 2 has a solid cylindrical trunk portion 6 having a slightly smaller diameter than the holes 5, 5, short pin portions 7, 7 projecting from the opposite ends of the trunk portion 6, and an engaging portion 8 at the center of the trunk portion 6. The overall length L of the connector 2 is equal to or slightly smaller than the outside width W of the portion of the member 1 having the walls 4, 4. The engaging portion 8 has a stepped engaging bore 8a intersecting the axis of the connector for engaging a weightlike nipple at the end of the inner wire of the Bowden cable, and a groove 8b for passing the inner wire. Each capped bush 3 is hollow cylindrical and has an outer periphery 9 of the same diameter as the hole 5, an inner periphery 10 diametrically slightly larger than the short pin portion 7 of the connector 2, a flange 11 on the outer periphery of a closed end thereof, i.e., the capped end, and a retaining flange 12 on the outer periphery of an open end thereof. The distance between the inner surfaces of the two flanges 11, 12 is equal to the thickness of the wall 4. The bush 3 is formed with a plurality of axial cutouts 13 across the retaining flange 12. The bush 3 thus constructed is made of an abrasion-resistant synthetic resin, preferably, nylon.

FIG. 3 is a perspective view showing a wire connecting structure useful for an operating device and embodying the invention. The embodiment is used for each arched actuating portion 1' of a device for operating a center-pull type brake for bicycles. The embodiment is similar to the one shown in FIGS. 1 and 2 in construction and operation and therefore will not be described in detail.

Although the above embodiments have been described with reference to a brake lever or brake as a manipulating device or operating device for bicycles, they are not limited to use for bicycles only.

The manipulating device is assembled in the manner to be described below with reference to FIG. 2. One of the bushes 3 is forced into the hole 5 in one of the walls 4 from outside. Next, the connector 2 is inserted through the hole 5 in the other wall 4, and one of the pin portions 7 at the connector ends is fitted into the bush 3 to cause the inner periphery 10 thereof to support the pin portion 7. The other bush 3 is similarly fitted into the hole 5 in the other wall 4 through which the connector 2 is inserted to cause the inner periphery 10 of the other bush to support the other pin portion 7. Thus, the connector 2 is rotatable on the inner peripheries 10, 10 of the bushes 3, 3 attached to the walls 4, 4 to follow the movement of the wire.

With the structure described above, the roller-shaped connector 2 can be attached to the manipulating member 1 or operating member 1' after the member has been formed. This eliminates the drawback of the conventional assembly that the work on the automatic forming line for the operating or manipulating device needs to be interrupted.

The abrasion-resistant capped bushes 3, 3 attached to the walls 4 and rotatably supporting the connector 2 assure proper rotation of the connector 2 which follows the movement of the wire.

What is claimed is:
1. A bicycle brake system comprising:
a brake manipulating member or brake operating member having a pair of opposed mutually parallel walls each formed with a hole, the hole of one of the walls being aligned along a common axis with the hole on the other of the walls,
a roller-type Bowden cable connector having a trunk portion slightly smaller than each hole in diameter and a short pin portion projecting from each end of the trunk portion and received in a respective hole with an annular play space formed between the periphery of each pin portion and an internal surface defining the respective hole, the connector having an overall length equal to or slightly smaller than the width of the brake manipulating member or brake operating member as measured between exterior surfaces of said pair of walls and said trunk portion has a length that is less than the distance between interior surfaces of said pair of walls with a clearance space formed between said interior surfaces and end surfaces of the trunk portion, the connector having a wire engaging portion at the center of the trunk portion which engages with an inner wire of a Bowden cable, and
a pair of capped bushes for plugging each of the holes and covering over each short pin portion, said bushes being made of abrasion-resistant synthetic resin and each having a cylindrical body with an outer periphery of the same diameter as a respective said hole to plug the annular play space therein, an inner periphery diametrically slightly larger than the short pin portion of the connector to permit relative rotation therebetween, a flange on the outer periphery of a closed end thereof which has an outer diameter that is greater than the diameter of the respective said hole and a retaining flange extending around the outer periphery of an open end thereof which has a diameter that is greater than the diameter of the respective said hole, each of the bushes being fitted in a respective said hole of the manipulating member or operating member and having the short pin portion of the connector inserted therein to support the pin portion by the inner periphery, the distance between inner surfaces of the flanges of each bush being equal to the thickness of said wall and wherein a plurality of axial cutouts are provided in each bush that extend across the retaining flange for enabling said bush to be compressed in a manner permitting the retaining flange to pass through the annular play space into a retaining position within said clearance space.

* * * * *